G. A. FABER.
TIRE PROTECTOR FOR MOTOR VEHICLES.
APPLICATION FILED JULY 30, 1915.

1,161,645. Patented Nov. 23, 1915.

Witnesses:
J. L. Sarbacher
Jean Joyce

Inventor:
George A. Faber
By Chapin & Ferguson
Attorney.

UNITED STATES PATENT OFFICE.

GEORGE A. FABER, OF BALTIMORE, MARYLAND.

TIRE-PROTECTOR FOR MOTOR-VEHICLES.

1,161,645.     Specification of Letters Patent.     Patented Nov. 23, 1915.

Application filed July 30, 1915. Serial No. 42,847.

*To all whom it may concern:*

Be it known that I, GEORGE A. FABER, a citizen of the United States, residing at Baltimore, in the State of Maryland, have invented certain new and useful Improvements in Tire-Protectors for Motor-Vehicles, of which the following is a specification.

This invention relates to improvements in tire protectors for motor vehicles, and has for its object to provide a cheap, simple and efficient device for removing obstacles from in front of the wheels and thereby preventing the tires from being punctured.

The invention consists of the novel construction and arrangement of the parts and combination of parts hereinafter more fully set forth in the following specification and pointed out in detail in the appended claims.

Figure 1:
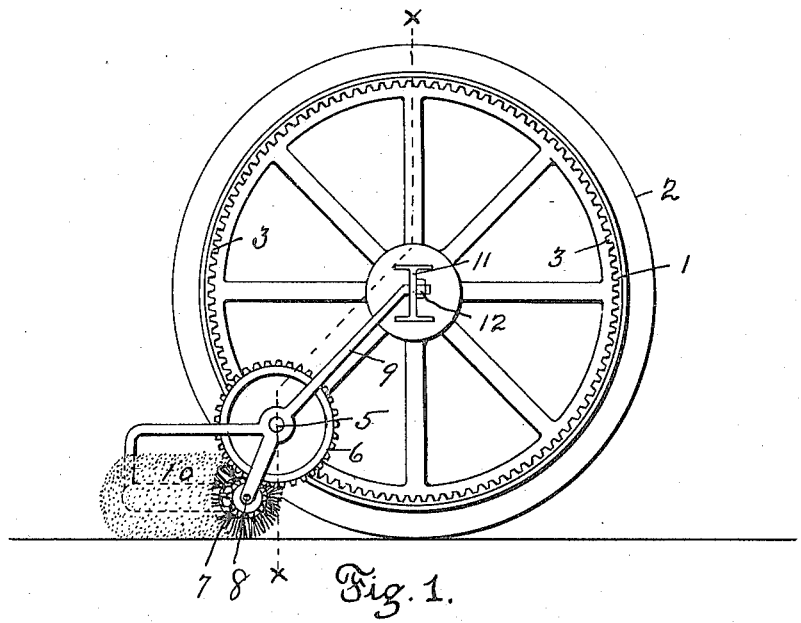
Figure 2:
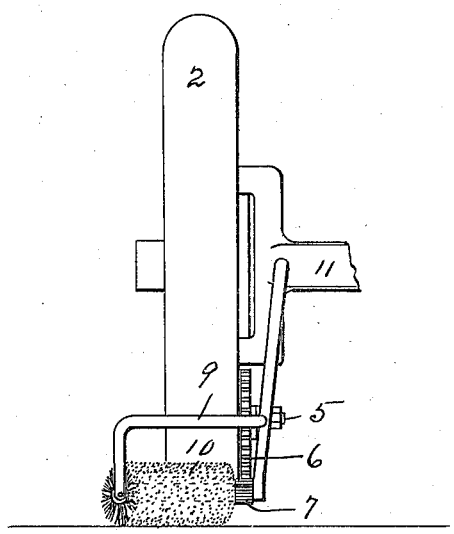
Figure 3:
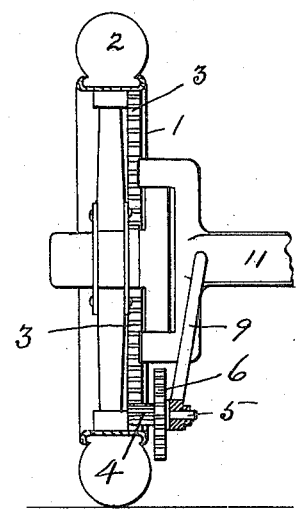

In the accompanying drawings, Figure 1 is a side elevation of a wheel with my invention applied thereto. Fig. 2 is a front view of the same. Fig. 3 is a section on the line X—X of Fig. 1.

Referring to the accompanying drawings forming part of this specification, and in which like reference numerals designate like parts throughout the several views thereof, 1 designates the wheel rim upon which the tire 2 is mounted, and the inner edge of which is provided with teeth 3 adapted to mesh with the gear-wheel 4 on the shaft 5, said gear wheel 4 being integral with the large gear-wheel 6 which in turn meshes with the small gear-wheel 7 on the brush shaft 8. The said shaft 8 is mounted in the lower end of the bracket 9 and is provided with a revolving brush 10. The upper end of said bracket 9 being held to the axle 11 by the bolt 12.

When the vehicle is moving forward the teeth 3 being on the inside of the wheel cause the gear-wheels 4 and 6 to revolve in the same direction as the vehicle wheel and the gear wheel 7 to revolve in the opposite direction, thereby causing the brush 10 to revolve in the opposite direction to that of the vehicle wheel, whereby any obstacle in front of the wheels which might cause a puncture of the tires will be brushed aside.

The device may be secured in front of each of the front wheels, or may be secured in front of all the wheels of the vehicle.

Having thus described my invention, what I claim is:

1. The combination with the vehicle wheel having teeth on the inner rim thereof, a brush mounted in front of said wheel, and means operated by said teeth for revolving said brush.

2. The combination with the vehicle wheel having teeth on the inner rim thereof, a frame carried by the axle and projecting in front of said vehicle wheel, a brush revolubly mounted in said frame in front of said vehicle wheel and having a gear wheel at one end thereof, a small gear-wheel mounted on said frame and in mesh with the teeth on the vehicle wheel, a large gear-wheel integral with the said small gear-wheel and in mesh with the gear-wheel on the brush shaft.

In testimony whereof I affix my signature in the presence of two witnesses.

GEORGE A. FABER.

Witnesses:
CHAPIN A. FERGUSON,
JOHN JAYER.

Copies of this patent may be obtained for five cents each, by addressing the "Commissioner of Patents, Washington, D. C."